US012466006B2

(12) United States Patent
Heck

(10) Patent No.: US 12,466,006 B2
(45) Date of Patent: Nov. 11, 2025

(54) TORCH SUPPORT AND GUIDE APPARATUS, METHOD OF USING SAME, AND KIT FOR CONSTRUCTING SAME

(71) Applicant: Philip Heck, Highland, MI (US)

(72) Inventor: Philip Heck, Highland, MI (US)

( * ) Notice: Subject to any disclaimer, the term of this patent is extended or adjusted under 35 U.S.C. 154(b) by 907 days.

(21) Appl. No.: 17/695,032

(22) Filed: Mar. 15, 2022

(65) Prior Publication Data

US 2023/0294218 A1 Sep. 21, 2023

(51) Int. Cl.
*B23K 37/02* (2006.01)
*B23K 10/00* (2006.01)

(52) U.S. Cl.
CPC .......... *B23K 37/0205* (2013.01); *B23K 10/00* (2013.01); *B23K 37/0241* (2013.01)

(58) Field of Classification Search
CPC ............ B23K 37/0211; B23K 37/0205; B23K 10/00; B23K 37/0241; B23K 37/0288
See application file for complete search history.

(56) References Cited

U.S. PATENT DOCUMENTS

| 2,001,294 | A | | 5/1935 | Anderson | |
|---|---|---|---|---|---|
| 4,256,288 | A | * | 3/1981 | Rojas | B23K 7/107 266/70 |
| 4,471,948 | A | * | 9/1984 | Holmes | B23K 7/10 266/58 |
| 4,792,657 | A | | 12/1988 | Conley | |
| 4,880,958 | A | | 11/1989 | Conley | |
| 5,360,157 | A | * | 11/1994 | Gilbert | B23K 9/32 228/32 |
| 5,511,765 | A | * | 4/1996 | Shippen | B23K 7/107 266/70 |
| 6,201,207 | B1 | | 3/2001 | Maruyama et al. | |
| 6,627,004 | B1 | * | 9/2003 | Lockhart | B23K 37/0252 266/73 |
| 9,687,933 | B2 | | 6/2017 | Buccella | |
| 10,001,506 | B2 | * | 6/2018 | Migia | H02K 5/26 |
| 2009/0212506 | A1 | | 8/2009 | Johansson | |

(Continued)

FOREIGN PATENT DOCUMENTS

| CN | 208662799 | U | * | 3/2019 |
|---|---|---|---|---|
| KR | 20140000256 | U | * | 7/2012 |

(Continued)

*Primary Examiner* — Thien S Tran
(74) *Attorney, Agent, or Firm* — Carrier, Shende & Associates P.C.; Fulchand P. Shende; Joseph P. Carrier

(57) ABSTRACT

A torch support and guide apparatus for a plasma cutting torch, for assisting a user in beveling workpiece edges and in sectioning workpieces. The apparatus includes a main support body having a base plate and a pair of support arms extending upwardly from the base plate, the arms configured to support a handle therebetween. The base plate has a cutout notch formed therein to accommodate a clamp subassembly which includes a U-shaped swing member and a clamping bracket. The base plate has a substantially rectangular shape, and has a horizontally extending groove formed in an upper surface thereof. The apparatus also includes a fence with a guide portion and a slide arm integrally attached to the guide portion. The slide arm of the fence fits slidably in the groove of the base plate. A kit for constructing the apparatus and a method of using the apparatus are also disclosed.

3 Claims, 9 Drawing Sheets

(56) References Cited

U.S. PATENT DOCUMENTS

| | | | | |
|---|---|---|---|---|
| 2011/0109022 A1* | 5/2011 | Flaig | ............. | B23K 7/001 |
| | | | | 266/77 |
| 2012/0242015 A1* | 9/2012 | Fagan | ............. | B23K 37/0288 |
| | | | | 266/60 |
| 2015/0258640 A1* | 9/2015 | Aubin | ............. | B23K 10/00 |
| | | | | 700/192 |
| 2021/0197324 A1* | 7/2021 | Prusek | ............. | B23K 37/0211 |

FOREIGN PATENT DOCUMENTS

| | | | |
|---|---|---|---|
| KR | 1374066 B1 * | 3/2014 | |
| KR | 101734446 B1 * | 4/2016 | |

* cited by examiner

TORCH SUPPORT AND GUIDE APPARATUS, METHOD OF USING SAME, AND KIT FOR CONSTRUCTING SAME

BACKGROUND OF THE INVENTION

Field of the Invention

The present invention relates to a torch support and guide apparatus for use with a plasma cutting torch. More particularly, the present invention relates to a torch support and guide apparatus having adjustable features, and which is usable when cutting a beveled edge on a metal workpiece. The invention also relates to a kit of components, and a method of using the inventive apparatus.

Description of the Background Art

Many plasma cutting torches are known and commercially available.

A number of different torch supports and related devices are known for helping cutting torch operators in their work.

Examples of some of the known torch supports and other related accessories for use with cutting torches include those described in U.S. Pat. Nos. 4,792,657, 4,880,958, 6,201,207, 9,687,933, and US Published Patent Application 2009-0212506.

Although the known cutting torch accessories are usable for their intended purposes, a need still exists in the art for an improved torch support and guide apparatus for use with plasma cutting torches. In particular, there is a need for an improved torch support and guide apparatus which will facilitate cutting beveled edges on metal workpieces.

SUMMARY OF THE INVENTION

Accordingly, it is an object of the present invention to provide a torch support method and apparatus useful for supporting and guiding a plasma cutting torch during cutting operation thereof on a workpiece.

It is another object of the present invention to provide a torch support method and apparatus usable to cut a beveled edge on a workpiece.

It is another object of the present invention to provide a torch support method and apparatus which can be adjusted to cut a workpiece at any desired angle.

It is another object of the present invention to provide a torch support method and apparatus having a height-adjustment feature.

A torch support and guide apparatus according to the present invention is provided for use with a known plasma cutting torch. However, the torch itself does not constitute part of the present invention.

A torch support and guide apparatus according to an illustrative embodiment of the present invention includes a main support body including a base plate and a pair of support arms extending upwardly from the base plate, the arms configured to support a handle therebetween.

The torch support and guide apparatus further includes a handle extending between, and attached to upper ends of the support arms.

The base plate has a substantially rectangular shape with a cutout opening formed in a first edge portion thereof. The base plate also has a horizontally extending groove formed in an upper surface thereof, which extends substantially parallel to a second edge portion of the base plate which is perpendicular to the first edge portion, and the base plate further has a threaded bore extending through the base plate at a central portion of the groove.

The support arms may be integrally formed with the base plate or alternatively, may be attached to the base plate. Each of the support arms has a vertically extending slot formed therethrough to adjustably support a pivotally adjustable clamp subassembly between the support arms.

The clamp subassembly, or clamp member, is another component of the apparatus according to the illustrative embodiment of the invention. The clamp subassembly includes a substantially U-shaped swing member, having a panel portion with a cutout notch formed therein, and two upwardly extending flanges on opposite ends of the panel portion.

The swing member fits inside of the cutout opening of the base plate, and each of the flanges of the swing member is attached to one of the support arms by a fastener at the vertically extending slot thereof, so as to permit both vertical and angular adjustment of the swing member by selectively loosening the fasteners, moving the clamp subassembly to a desired location and angular orientation, and then tightening the fasteners.

The clamp subassembly also includes a clamping bracket adjustably attached to a front end of the swing member on opposite sides of the notch. The clamping bracket is provided for selectively clamping a working end of a plasma cutting torch to the swing member.

The torch support and guide apparatus according to the illustrative embodiment also includes a fence for controlling a depth of a cut. The fence includes a guide portion, with an L-shaped cross section, for abuttingly contacting an edge portion of a workpiece during use. The fence also includes a slide arm, integrally attached to the guide portion and having a horizontally extending slot formed therethrough. The slide arm of the fence fits slidably in the groove of the base plate, and a threaded fastener adjustably attaches the fence to the base plate by passing through the slot of the slide arm and into the threaded bore of the base plate.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION

Figure 1:
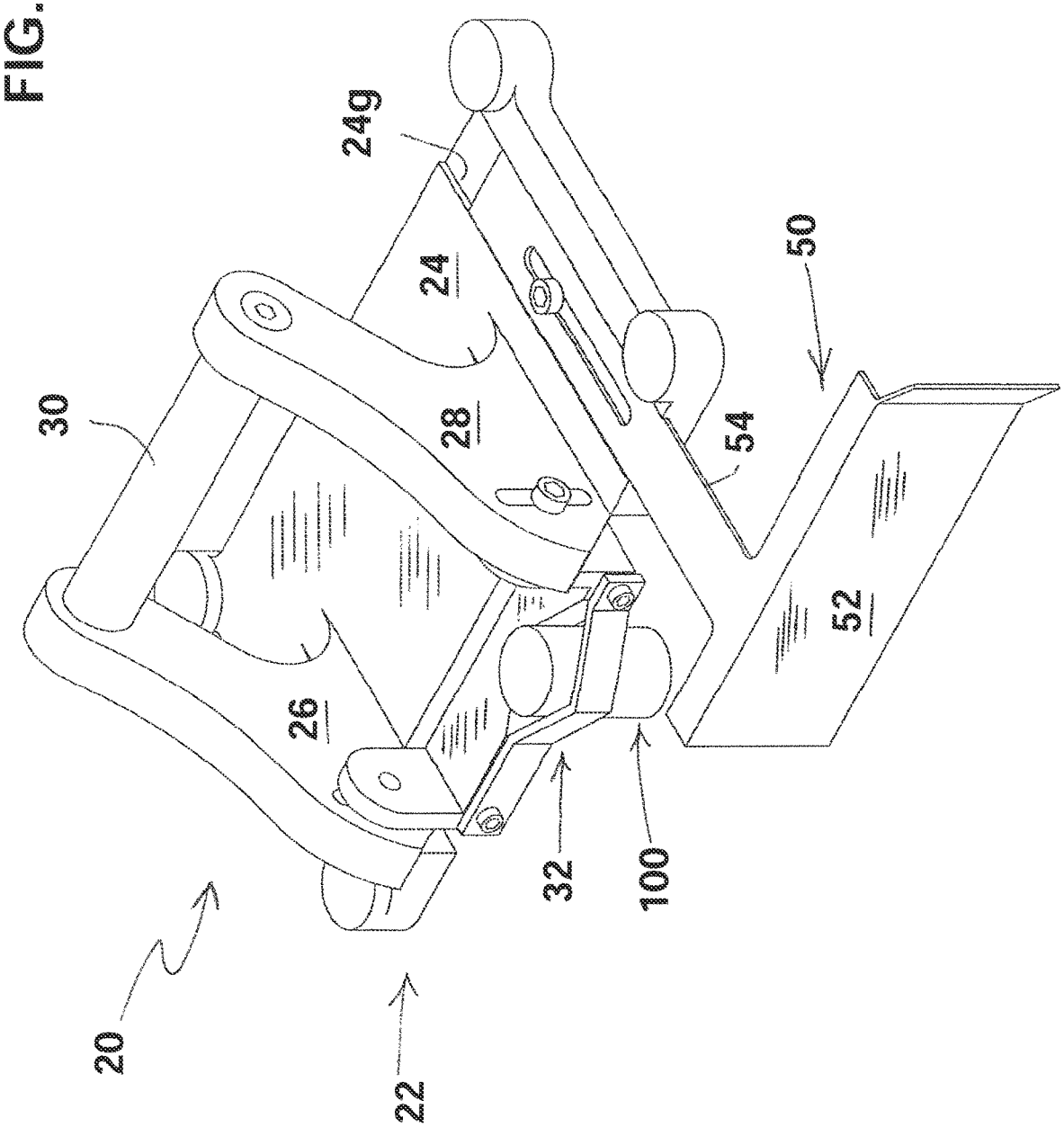
FIG. 1 is a perspective view of a torch support and guide apparatus according to an illustrative embodiment of the invention, and also showing a torch cutting head.

It should be understood that only structures and methodology needed for illustrating selected embodiments of the present invention are described herein. Other conventional structures, and those of ancillary and auxiliary components of the apparatus, will be known and understood by those skilled in the art.

Throughout the present specification, relative positional terms like 'upper', 'lower', 'front', 'rear', 'top', 'bottom', 'horizontal', 'vertical', and the like are used to refer to the orientation of the apparatus as shown in the drawings. These terms are used in an illustrative sense to describe the depicted embodiments, and are not meant to be limitative. It will be understood that the depicted apparatus may be placed at an orientation different from that shown in the drawings, such as inverted 180 degrees or transverse to that shown, and in such a case, the above-identified relative positional terms will no longer be accurate.

Referring now to the drawings, a torch support and guide apparatus according to the present invention is shown generally at 20, and is provided for use with a known plasma cutting torch, the cutting head of which is shown in the drawings at 100. The reference number 100 is used alternately herein for either the entire torch or the cutting head of the torch.

However, it should be understood that the torch 100 does not constitute part of the present invention. The torch support and guide apparatus 20 according to the present invention will accept and work with essentially any plasma torch, either the "hand-held" type or a mechanical torch that is operated remotely.

The torch support and guide apparatus 20 according to the depicted embodiment of the present invention includes a main support body 22 including a base plate 24 and a pair of support arms 26, 28 extending upwardly from the base plate, the arms configured to support a handle 30 therebetween.

The torch support and guide apparatus 20 further includes the handle 30 extending between, and attached to upper ends of the support arms 26, 28.

Figure 2:
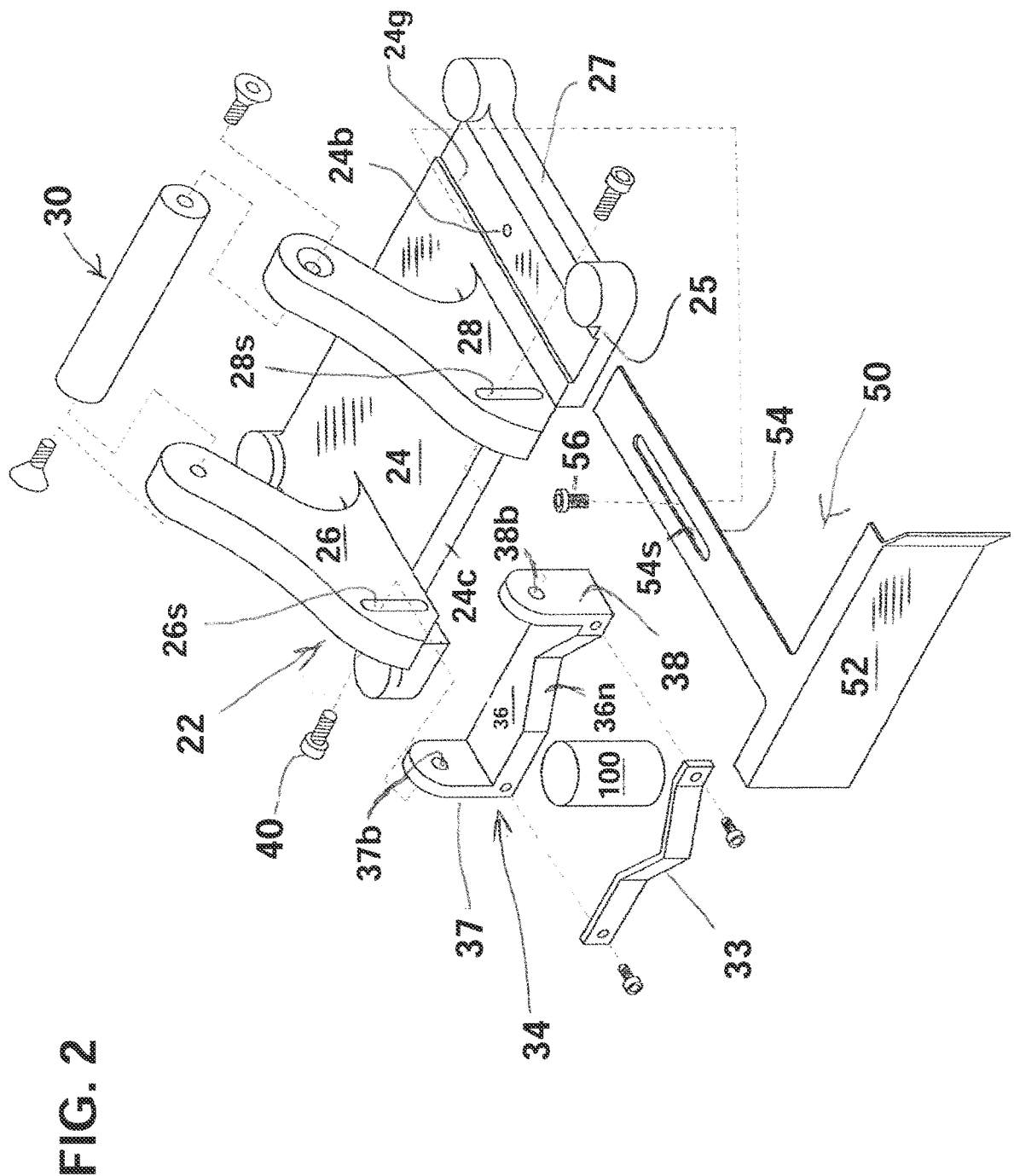
FIG. 2 is an exploded view of the torch support and guide apparatus of FIG. 1, showing the component parts thereof.
Figure 3:
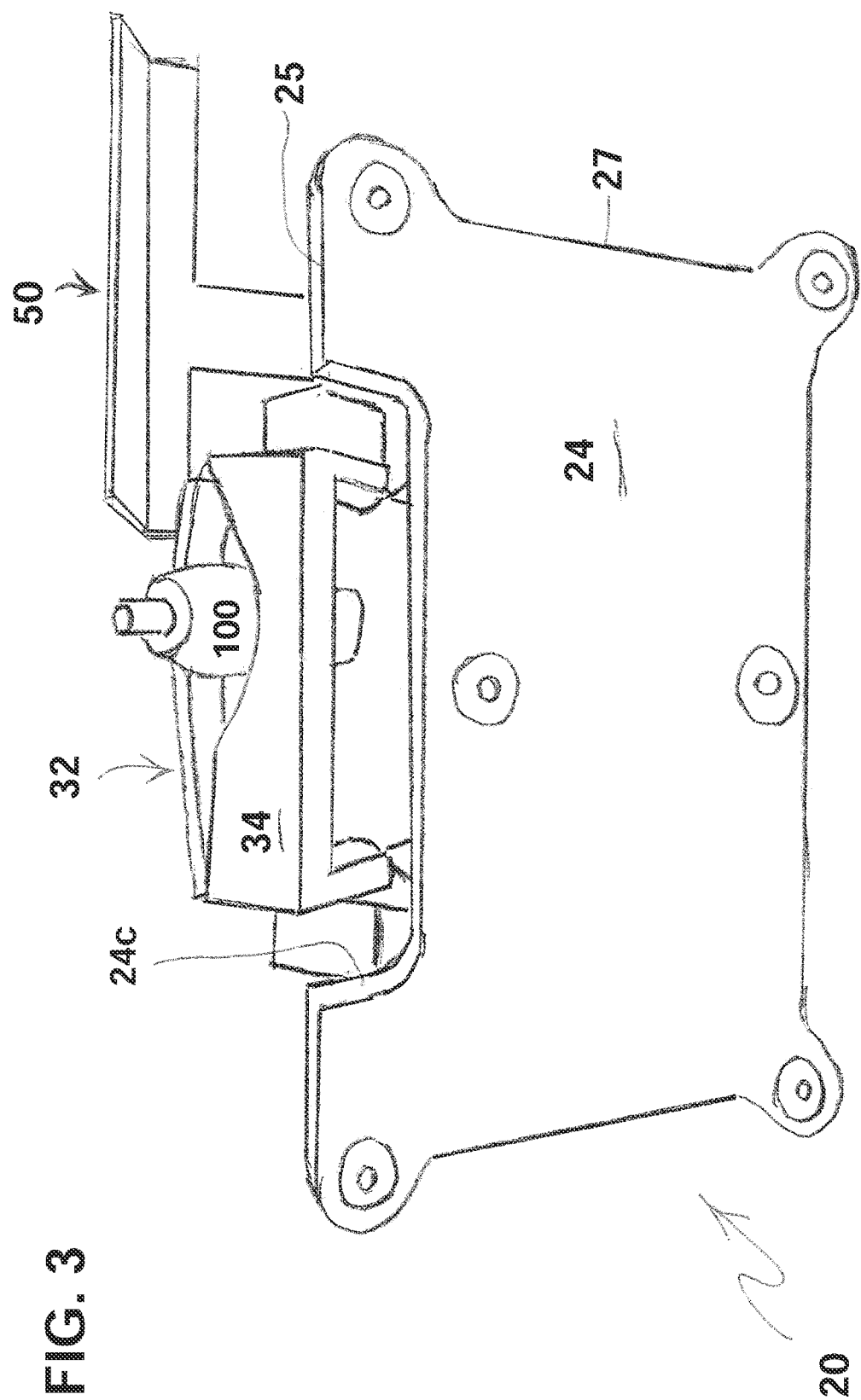
FIG. 3 is a lower perspective view of the torch support and guide apparatus of FIG. 1, showing the underside thereof.

As seen in FIGS. 2 and 3, the base plate 24 has a substantially rectangular shape with rounded corners, and with a cutout opening 24c formed in a first edge portion 25 thereof.

The base plate 24 also has a horizontally extending shallow groove 24g formed in an upper surface thereof, the groove extending substantially parallel to a second edge portion 27 of the base plate which is perpendicular to the first edge portion 25. The groove 24g is provided to slidably receive a slide arm 54 of a fence 50 therein, as will be further described below. Although not shown in FIG. 2, the base plate 24 may, optionally, have two spaced apart parallel grooves 24g formed in the upper surface thereof, in order to accommodate dual fences.

The base plate 24 further has a threaded bore 24b extending vertically in the base plate at a central portion of the groove 24g.

Figure 4:
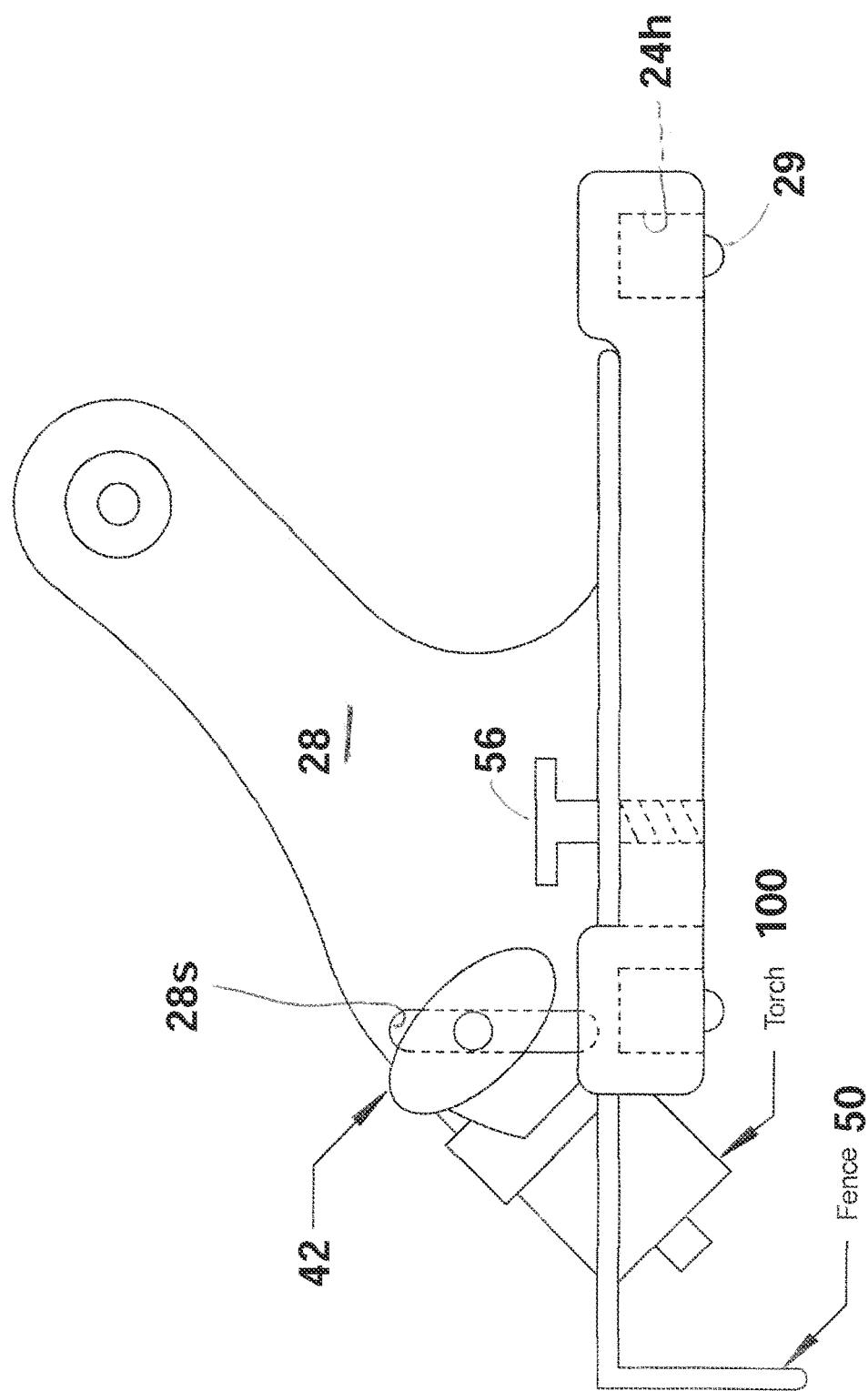
FIG. 4 is a side plan view of the torch support and guide apparatus.

Optionally, as shown in FIGS. 3 and 4, the underside of the base plate 24 may have a plurality of blind holes 24h formed therein, and each of these holes may receive a roller bearing 29 therein to facilitate lateral sliding movement of the apparatus 20 on a workpiece.

The support arms 26, 28 may be integrally formed with the base plate 24, or alternatively, the support arms may be formed separately and attached to the base plate. Each of the support arms 26, 28 has a vertically extending slot 26s, 28s respectively formed therethrough to adjustably support a pivotally adjustable clamp subassembly 32 between the support arms.

The clamp subassembly 32 is another component of the apparatus 20 according to the illustrative embodiment of the invention. The clamp subassembly 32 includes a substantially U-shaped swing member 34 having a panel portion 36 with a cutout notch 36n formed therein, and two upwardly extending flanges 37, 38 on opposite ends of the panel portion. The notch 36n may be substantially V-shaped, as shown. Alternatively, the notch 36n may have a concave arcuate shape. Each of the flanges 37, 38 is respectively provided with a threaded bore 37b, 38b formed therein and extending substantially horizontally, as shown.

The swing member 34 fits inside of the cutout opening 24c of the base plate 24 with enough clearance room to permit angular adjustment of the swing member in relation to the base plate.

Each of the flanges 37, 38 of the swing member 34 is respectively connected to one of the support arms 26, 28 by a fastener 40 at the vertically extending slots 26s, 28s thereof. The fasteners 40 pass through the slots 26, 28 and threadably engage the threaded bores 37b, 38b of the flanges 37, 38. This arrangement permits both vertical and angular adjustment of the swing member, and such adjustment is done by selectively loosening the fasteners 40, moving the swing member to a desired height and angular orientation, and then tightening the fasteners.

Figure 5:
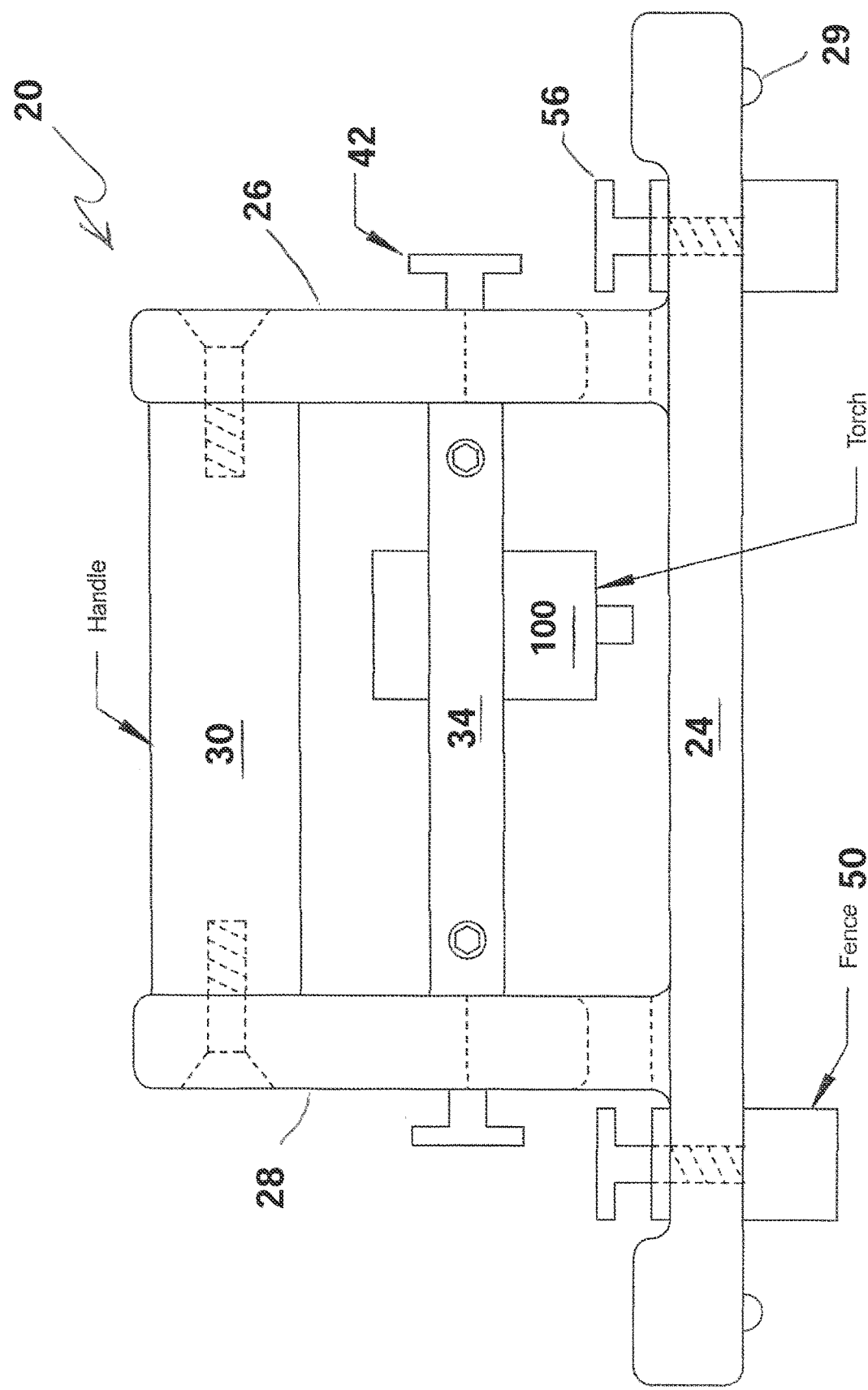
FIG. 5 is a rear plan view of the torch support and guide apparatus.

As shown in FIGS. 4 and 5, the head portions of the fasteners 40 may be provided with an enlarged handle 42 to permit easy tightening and loosening thereof by a user.

The clamp subassembly 32 also includes a clamping bracket 33 adjustably attached to a front end of the swing member 34 on opposite sides of the notch 36n. The clamping bracket 33 is provided for selectively clamping a working head of a plasma cutting torch 100 to the swing member 34.

The torch support and guide apparatus 20 according to the illustrative embodiment also includes at least one fence 50 for controlling a depth of a cut made in a workpiece (not shown) during use. If desired, dual fences may be used for greater stability. An embodiment of the apparatus 20 having dual fences thereon is shown in FIG. 5.

As shown in FIGS. 1 and 2, the fence 50 includes a guide portion 52, with an L-shaped cross section, for slidably contacting an edge portion of a workpiece during use.

The fence 50 also includes a slide arm 54, integrally attached to the guide portion 52 and having a horizontally extending slot 54s formed therethrough. The slide arm 54 of the fence 50 fits slidably in the groove 24g of the base plate, and another threaded fastener 56 passes through the slot 54s of the slide arm 54, and into the threaded bore 24b of the base plate 24, to adjustably attach the fence 50 to the base plate.

Kit of Components

The present invention also relates to a kit of components which may be used to assemble the torch support and guide apparatus 20 as previously described. This is because the components of the torch support and guide apparatus 20 may be packaged and sold as a kit in which some assembly is required.

The components of such a kit are shown in FIG. 2, although the cutting torch head 100 is not a component of the kit.

The kit hereof includes a main support body 22 including a base plate 24 and a pair of support arms 26, 28 extending upwardly from the base plate.

The kit's base plate 24 has a substantially rectangular shape with a cutout opening 24c formed in a first edge portion 25 thereof, and also has a horizontally extending groove 24g formed in an upper surface thereof, the groove extending substantially parallel to a second edge portion 27 of the base plate which is perpendicular to the first edge portion. The base plate 24 further has a threaded bore 24b extending therethrough at a central portion of the groove 24g.

The support arms 26, 28 of the main support body 22 are configured to support a handle 30 therebetween, and each of the support arms has a vertically extending slot 26s, 28s formed respectively therethrough.

The kit also includes a handle 30 which fits between the support arms 26, 28 of the main support body 22.

The kit additionally includes a substantially U-shaped swing member 34 having a panel portion 36 with a notch 36n formed therein, and two upwardly extending flanges 37, 38 on opposite ends of the panel portion. The swing member 34 fits in the cutout opening 24c of the base plate. Each of the flanges 37, 38 of the swing member 34 are attachable to one of the support arms 26, 28 at the vertically extending slot thereof, in a manner so as to permit both vertical and pivotal adjustment of the swing member;

The kit also includes a clamping bracket 33 attachable to the front end of the swing member 34 on opposite sides of the notch 36n. The clamping bracket 33 is provided for selectively clamping a working head 100 of a plasma cutting torch to the swing member.

The kit hereof additionally includes a fence 50 having a guide portion 52 with an L-shaped cross section, and a slide arm 54 integrally attached to the guide portion and having a horizontally extending slot 54 formed therethrough. The slide arm 54 of the fence 50 fits slidably in the groove 24g of the base plate 24.

Optional Adapter Bracket

Figure 6:
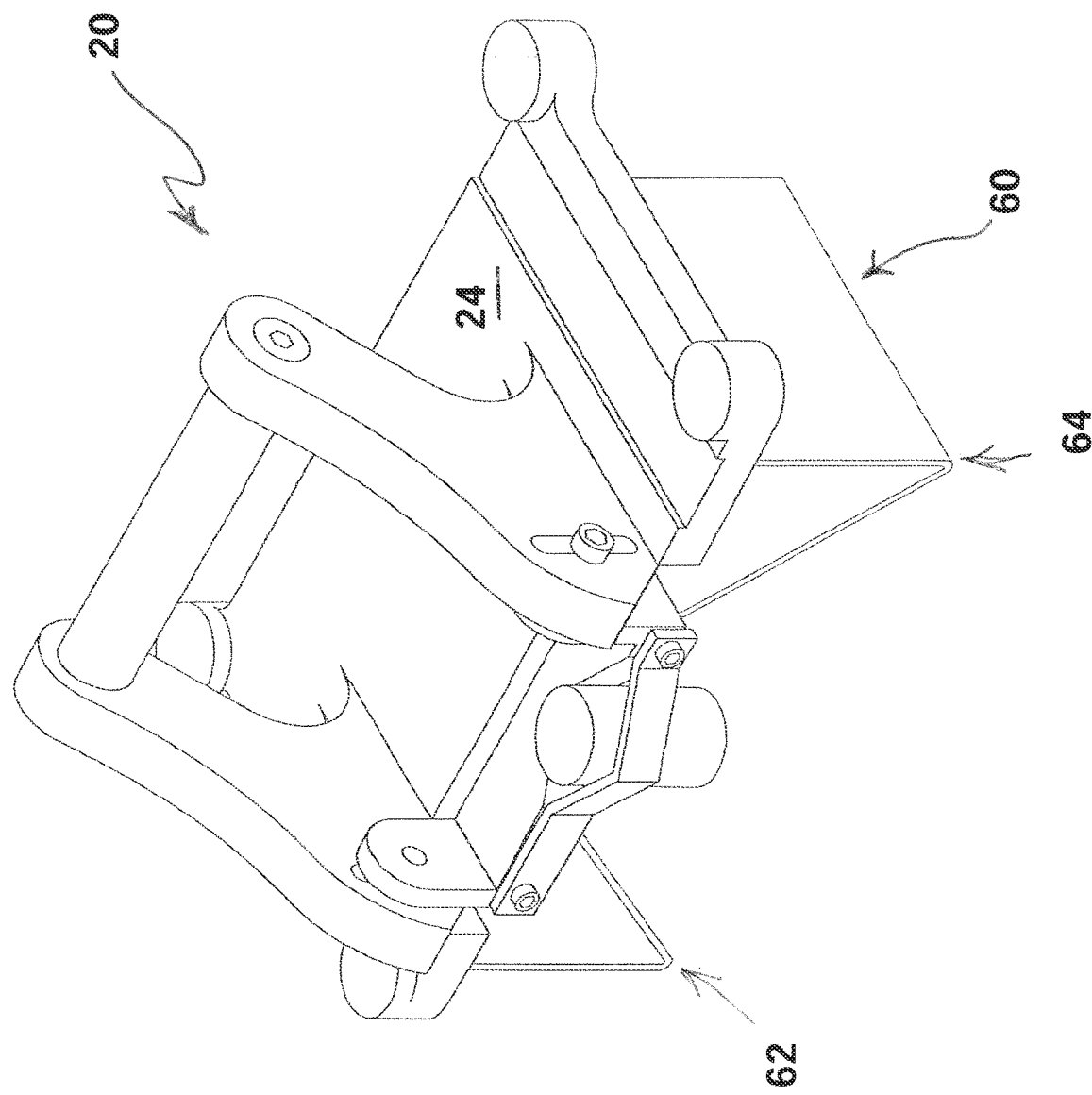
FIG. 6 is a perspective view of a torch support and guide apparatus similar to FIG. 1 showing a torch head mounted thereon, and with an optional adapter bracket mounted to the underside of the apparatus.

FIG. 6 is a perspective view of a torch support and guide apparatus 20 similar to the adapter apparatus as previously described, showing a torch head 100 mounted thereon, and also showing an optional adapter bracket 60 mounted to the underside of the base plate 24. As previously noted, the torch head 100 does not form a part of the inventive apparatus 20.

Figure 7:
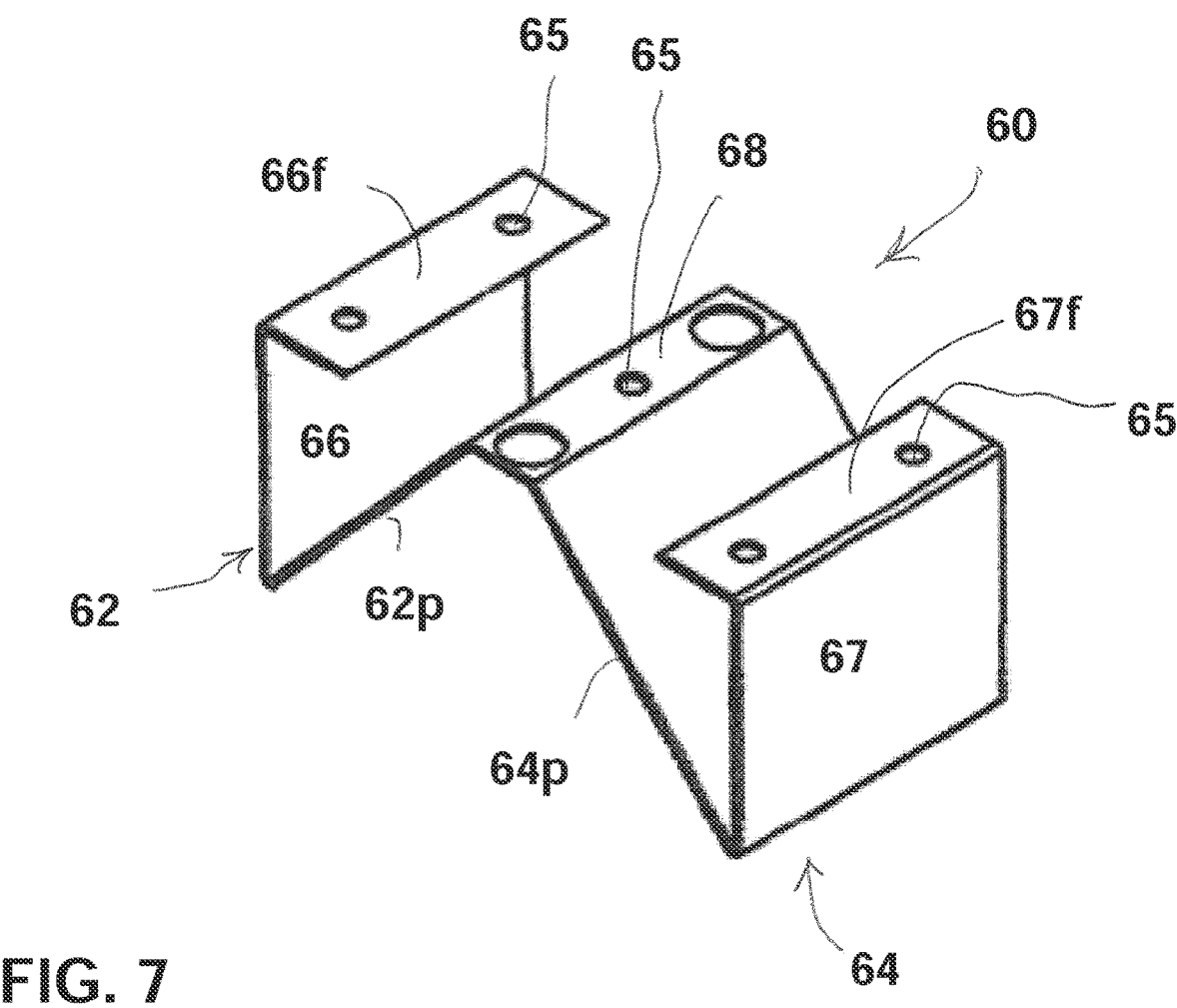
FIG. 7 is a perspective view of the adapter bracket, shown separately from the torch support and guide apparatus.
Figure 8:
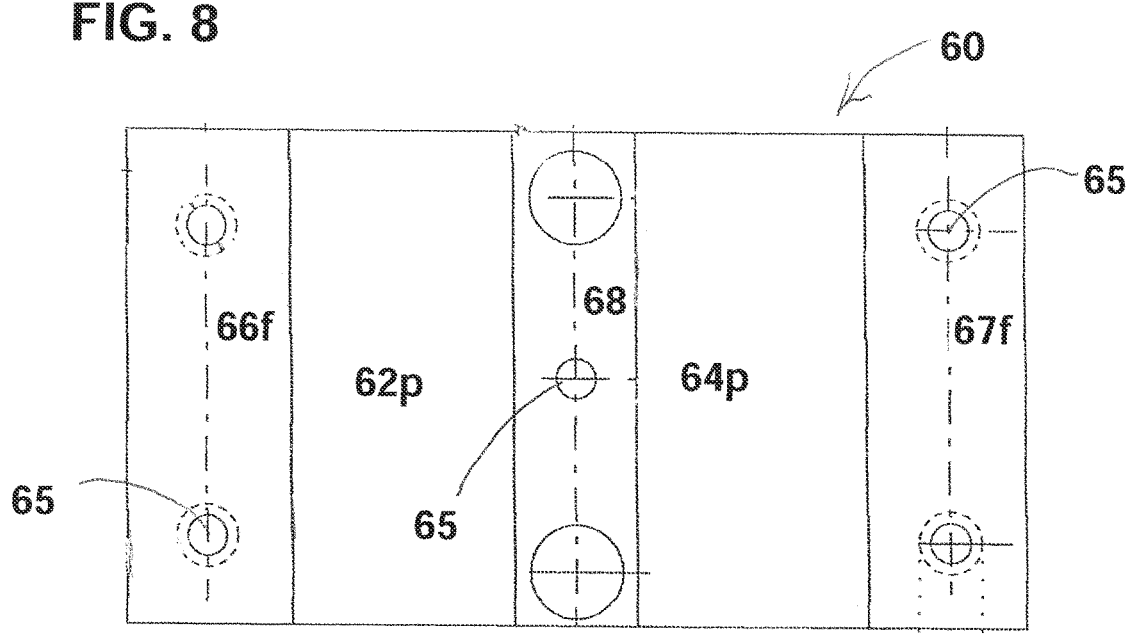
FIG. 8 is a top plan view of the adapter bracket of FIG. 7.
Figure 9:
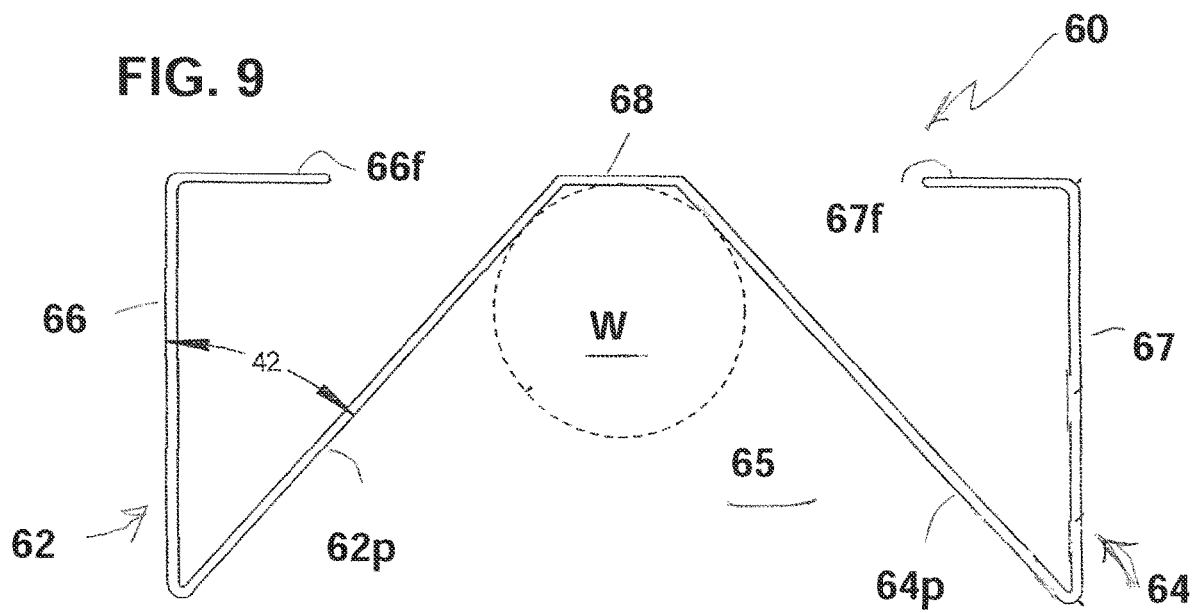
FIG. 9 is a side plan view of the adapter bracket of FIGS. 7-8.

The adapter bracket 60 is formed from a single rectangular piece of metal which has been bent into the desired shape, and is shown separately from the torch support and guide apparatus 20 in FIGS. 7-9.

This adapter bracket 60 includes two downwardly extending pointed ridges 62, 64 which cooperate to form an angular recess 65 having an inverted V shape therebetween. This recess 65 is defined primarily by two converging panels 62p and 64p.

The recess 65 is provided to receive a cylindrical workpiece W therein, as shown by the circular dotted line in FIG. 9. This recess 65 is configured to receive various cylindrical workpieces of many different sizes and diameters therein to permit torch work on the workpiece W, such as beveling the outer edge portion of the workpiece, or cutting the workpiece into sections.

In addition to the converging panels 62p and 64p, the adapter bracket 60 includes two vertical panels 66, 67 which form outer walls of the pointed ridges 62, 64. The adapter bracket 60 also includes two inwardly extending horizontal flanges 66f, 67f at the top of the vertical panels 66, 67, respectively, and a joining flange 68 extending between and joining the converging panels 62p and 64p.

Two or more of the flanges 66f, 67f and 68 have through holes 65 formed therein to permit mounting of the adapter bracket 60 on the lower surface of the base plate 24 using conventional fasteners.

Method of Use

The present invention also relates to a method of method of cutting a workpiece, using a plasma cutting torch and the torch support and guide apparatus 20 as previously described herein.

Figure 10:
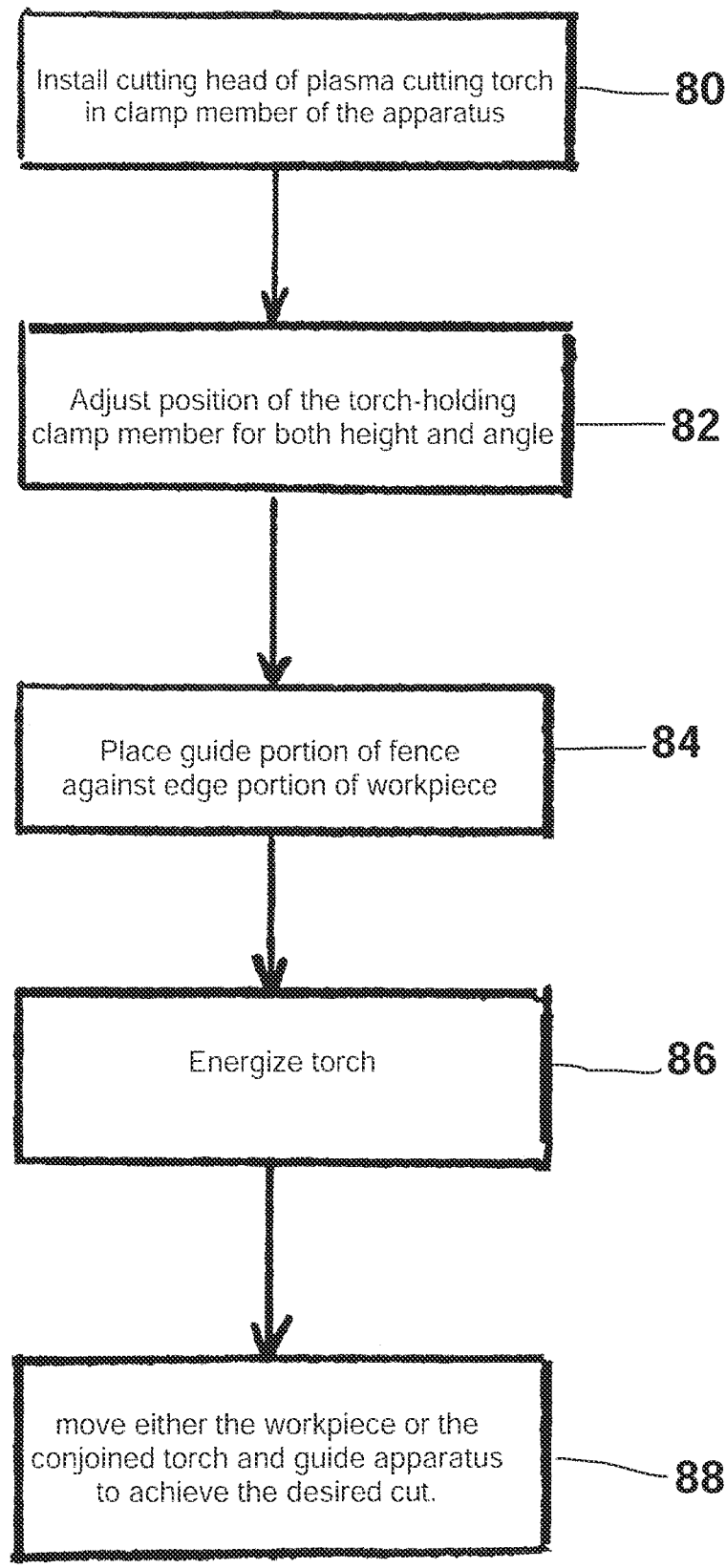
FIG. 10 is a flow chart showing steps in an exemplary method according to the invention.

FIG. 10 is a flow chart showing steps in an exemplary method according to the invention.

The method includes a first step of clamping a cutting head of a plasma cutting torch 100 in the clamp member 32 of the torch support and guide apparatus 20. This step is shown at 80 in the flow chart of FIG. 10.

The method includes a second step of adjusting the position of the torch and clamp member on the torch support and guide for both height and angle. This step is shown at 82 in the flow chart of FIG. 10.

The method also includes a subsequent step of contacting an edge portion of the workpiece with the guide portion of the fence or fences, if dual fences are used. This step is shown at 84 in the flow chart of FIG. 10.

The method also includes a subsequent step of moving either the workpiece or the guide apparatus 20, with the energized torch 100 attached, to make the desired cut. This movement step may be performed by moving the guide apparatus 20 and torch cutting head 100 along the edge of the workpiece, or by holding the torch cutting head in one place and moving the workpiece in relation to the position of the torch cutting head.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

Having, thus, described the invention, what is claimed is:

1. A torch support and guide apparatus for use with a plasma cutting torch, the apparatus comprising:
    a main support body comprising:
        a base plate having a rectangular shape with a cutout opening formed therein at a first edge portion thereof, the base plate having a horizontally extending groove formed in an upper surface thereof, the groove extending parallel to a second edge portion of the base plate, the base plate further having a threaded bore extending therethrough proximate a portion of the groove;
        a pair of integrally formed support arms extending upwardly from the base plate and configured to support a handle therebetween, each of the support arms having a vertically extending slot formed therethrough;
    a handle which extends between and connects the support arms;
    a pivotally adjustable clamp subassembly disposed between the support arms, the clamp subassembly comprising:

a U-shaped swing member having a panel portion with a notch formed therein and two upwardly extending flanges on opposite ends thereof, at least part of the swing member fitting in the cutout opening of the base plate, each of the flanges of the swing member attached to one of the support arms by a fastener at the vertically extending slot thereof so as to permit both vertical and pivotal adjustment of the swing member by selectively adjusting the fasteners;

a clamping bracket adjustably attached to the front end of the swing member at a side edge of the panel portion, the clamping bracket provided for selectively clamping a working end of the plasma cutting torch to the swing member;

a fence having a guide portion with an L-shaped cross section, and a slide arm integrally attached to the guide portion and having a horizontally extending slot formed therethrough, the slide arm fitting slidably in the groove of the base plate, and a threaded fastener adjustably attaching the slide arm to the base plate by passing through the slot of the slide arm and into the threaded bore of the base plate.

2. The torch support and guide apparatus of claim 1, wherein the base plate has a plurality of openings formed in a lower surface thereof, each of the openings receiving a roller bearing therein.

3. A kit usable for constructing a torch support and guide apparatus, the kit comprising:

a main support body comprising a base plate and a pair of integrally formed support arms extending upwardly from the base plate, the base plate having a rectangular shape with a cutout opening formed in a first edge portion thereof, and having a horizontally extending groove formed in an upper surface thereof, the groove extending parallel to a second edge portion of the base plate which is perpendicular to the first edge portion, the base plate further having a threaded bore extending therethrough at a portion of the groove;

the support arms configured to support a handle therebetween, each of the support arms having a vertically extending slot formed therethrough;

a handle which fits between the support arms of the main support body;

a U-shaped swing member having a panel portion with a notch formed therein and two upwardly extending flanges on opposite ends thereof, at least part of the swing member fitting in the cutout opening of the base plate, each of the flanges of the swing member attachable to one of the support arms at the vertically extending slot in a manner to permit both vertical and pivotal adjustment of the swing member;

a clamping bracket attachable to the front end of the swing member on opposite sides of the notch, the clamping bracket provided for selectively clamping a working end of the plasma cutting torch to the swing member; and a fence having a guide portion with an L-shaped cross section, and a slide arm integrally attached to the guide portion and having a horizontally extending slot formed therethrough, the slide arm fitting slidably in the groove of the base plate.

\* \* \* \* \*